Oct. 28, 1924.
R. CAREY
1,513,444
CABLE RELEASE FOR CAMERAS
Filed Jan. 31, 1924
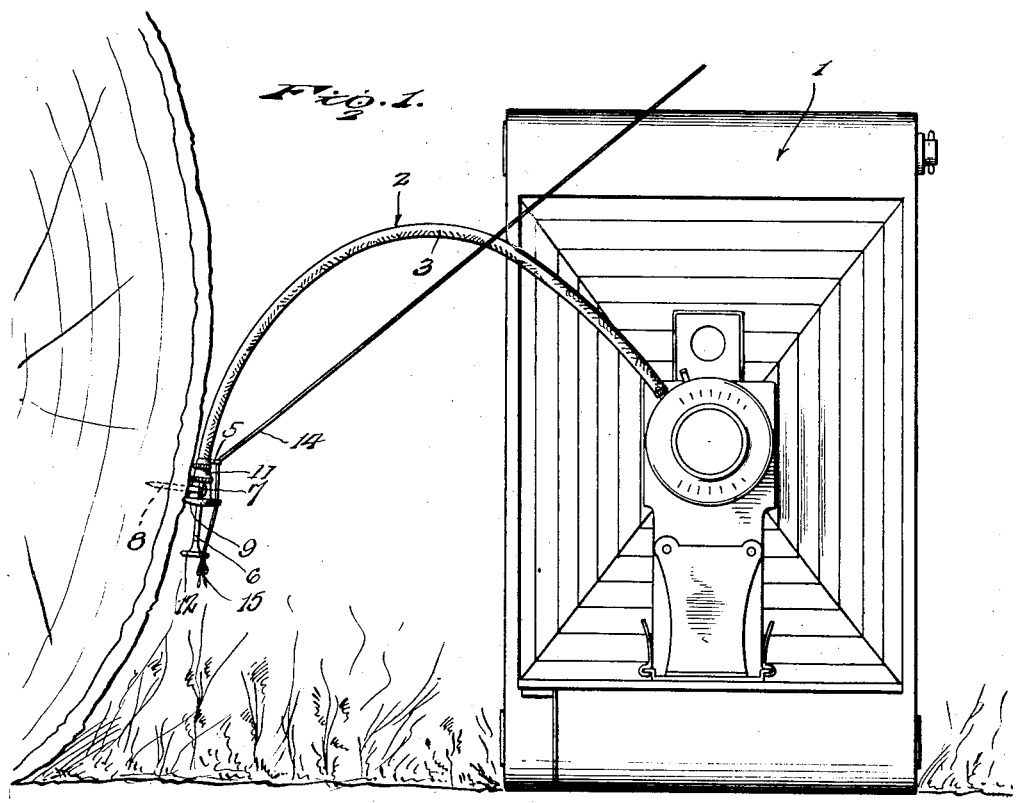
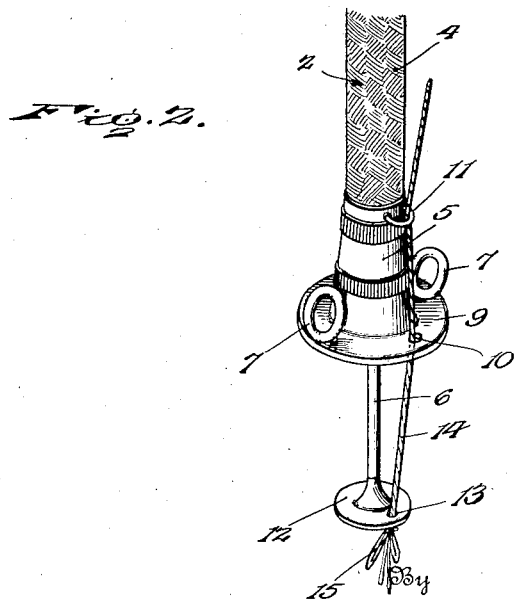
Inventor
R. Carey.
By Lloyd Lacey, Attorney Patented Oct. 28, 1924.

1,513,444

UNITED STATES PATENT OFFICE.

ROSS CAREY, OF KLEIN, MONTANA.

CABLE RELEASE FOR CAMERAS.

Application filed January 31, 1924. Serial No. 689,733.

*To all whom it may concern:*

Be it known that I, Ross CAREY, a citizen of the United States, residing at Klein, in the county of Musselshell and State of Montana, have invented certain new and useful Improvements in Cable Releases for Cameras, of which the following is a specification.

This invention relates to cable releases for cameras and more particularly to that type which are designed to be operated from a distant point, the object of the invention being to provide means whereby one may photograph oneself either alone or in a group and may photograph wild animal life from a safe distance or from a place of concealment.

Another object of the invention is to so construct the cable release that the operation thereof will not in any way jar the camera or interfere with the proper functioning of the shutter.

Another object of the invention is to provide a cable release of the type mentioned which may be readily attached to any fixed object adjacent which the camera is arranged and which may be readily removed from such object after the picture or pictures have been taken.

In the accompanying drawing:

Figure 1 is a view illustrating the cable release embodying the invention in use;

Figure 2 is a perspective view of the operating end of the release.

In the drawing, the numeral 1 indicates any ordinary camera capable of the operation of its shutter through the manipulation of a cable release, and the numeral 2 indicates in general the said release, the same comprising the usual Bowden wire 3 which is operatively connected at one end with the shutter casing and with the shutter actuating means within the casing, the sheath of the cable release, indicated by the numeral 4, being provided at its other end with a ferrule 5 having a central bore (not shown) for the slidable plunger 6 which is connected with the wire of the release and against which endwise pressure is ordinarily exerted by the finger for the purpose of actuating the release to in turn actuate the shutter. In carrying out the invention the release 2 will be of a length such as to permit of attachment of the ferrule 5 to any suitably located fixed object and the arrangement of the camera 1 in a position to make the exposure without any likelihood, however, of sharp bends being formed in the cable of the release which would be liable to cause binding of the cable. This does not indicate, however, that the cable release need be of any considerable length, as ordinarily no difficulty will be experienced in so mounting the camera as to permit of attachment of the ferrule 5 to an adjacent fixed object. To provide for such attachment of the ferrule, to the fixed object which, in Figure 1, is illustrated as in the nature of a fallen tree trunk, eyes 7 are fixedly arranged at diametrically opposite sides of the ferrule 5, and nails or other securing elements 8 may be driven through these eyes and into the fixed object. The outer end of the ferrule 5 is provided with the usual circumscribing flange indicated by the numeral 9, and this flange is formed at a suitable point in its circumference, as, for example, substantially midway between the eyes 7, with an opening indicated by the numeral 10.

An eye 11 is fixed upon the inner end of the ferrule 5 in alinement with the opening 10 or in substantial alinement therewith and this eye is preferably formed smooth and rounded in cross section so that no rough surface will be presented. The ordinary finger button of the release is indicated by the numeral 12 and is fixed at the outer end of the plunger 6, this button being provided with an opening 13 which will ordinarily be arranged in substantial alinement with the opening 10. The actuation of the release from a point remote from the camera is effected through the medium of a cord or other flexible element indicated by the numeral 14, one end of which is threaded through the opening 13 and knotted, as at 15, so as to insure of the cord being anchored in place at this end. The cord is likewise led through the opening 10 and through the eye 11 and from the eye the cord may be extended in any direction desired. If, for example, one wishes to take a photograph of oneself either alone or in a group, the other end of the cord will be grasped and, the camera having been properly focused, and the person having arranged himself in position before the camera either alone or in a group, a pull is exerted upon the cord thus effecting the usual inward movement of the stem or plunger 6 and operation of the camera shutter. Inasmuch as the ferrule of the cable release is securely fixed upon the fixed object adjacent which the camera is arranged, the manipulation of the cord will in no way jar the camera or otherwise disturb the same.

Having thus described the invention, what is claimed as new is:

1. In a cable release for cameras, the combination with the usual ferrule at the free end of the release and the usual plunger slidable in the ferrule and connected with the wire of the release, of means whereby the ferrule may be secured to a fixed object, means upon the plunger adapted for the connection thereto of one end of a flexible pull element, and means upon the said ferrule for guiding the said pull element.

2. In a cable release for cameras, the combination with the usual ferrule at the free end of the release and the slidable plunger in the ferrule to effect movement of the wire of the release, of an eye upon one side of the ferrule for the passage of a securing element adapted to be driven into a stationary object to secure the ferrule in fixed relation thereto, guiding means upon the ferrule, and means upon the plunger for the anchorage for one end of a flexible pull element adapted to be threaded through the said guiding means.

3. In a cable release for cameras, the combination with the usual ferrule at the free end of the release, provided with a flange, and the usual plunger slidable through the ferrule and operable to effect operation of the wire of the release, of an eye upon one side of the ferrule for the passage of a securing element adapted to be driven into a fixed object whereby to secure the ferrule in fixed relation to said object, an eye upon the ferrule, the flange of the ferrule having an opening in substantial alinement with the eye, the said plunger being provided with an opening, and a flexible pull element threaded through the second mentioned eye, the opening in the flange, and the opening in the said plunger and provided with an abutment to prevent its withdrawal from the last mentioned opening, the said pull element constituting means whereby the plunger may be actuated from a distance.

In testimony whereof I affix my signature.

ROSS CAREY. [L. S.]